United States Patent
Baek et al.

(10) Patent No.: US 8,388,212 B2
(45) Date of Patent: Mar. 5, 2013

(54) LIGHT EMITTING DIODE PACKAGE AND DISPLAY APPARATUS HAVING THE SAME

(75) Inventors: Seung Hwan Baek, Seoul (KR); Young-keun Lee, Cheonan-si (KR); Dongmin Yeo, Asan-si (KR); Eui Jeong Kang, Asan-si (KR); Yong-Hoon Kwon, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 122 days.

(21) Appl. No.: 13/009,648

(22) Filed: Jan. 19, 2011

(65) Prior Publication Data
US 2011/0280045 A1 Nov. 17, 2011

(30) Foreign Application Priority Data
May 11, 2010 (KR) .................. 10-2010-0044107

(51) Int. Cl.
F21V 7/00 (2006.01)
F21V 7/04 (2006.01)
H01R 33/00 (2006.01)

(52) U.S. Cl. ........ 362/634; 362/607; 362/616; 362/646; 362/640; 362/647

(58) Field of Classification Search .......... 362/634–634, 362/607, 616, 612, 646, 640, 647
See application file for complete search history.

(56) References Cited

U.S. PATENT DOCUMENTS

| | | | |
|---|---|---|---|
| 7,441,938 B2 * | 10/2008 | Sakai et al. | 362/634 |
| 7,527,391 B2 * | 5/2009 | Wu | 362/257 |
| 7,578,610 B2 * | 8/2009 | Sakamoto et al. | 362/634 |
| 7,604,389 B2 * | 10/2009 | Sakai et al. | 362/612 |
| 7,632,002 B1 * | 12/2009 | Park et al. | 362/616 |
| 7,744,266 B2 * | 6/2010 | Higley et al. | 362/646 |
| 7,806,561 B2 * | 10/2010 | Chen | 362/265 |
| 7,909,480 B2 * | 3/2011 | Kang et al. | 362/249.02 |
| 2008/0106898 A1 | 5/2008 | Park et al. | |
| 2008/0186734 A1 | 8/2008 | Huang et al. | |
| 2009/0122227 A1 | 5/2009 | Hong et al. | |
| 2009/0185393 A1 | 7/2009 | Kang et al. | |
| 2009/0190330 A1 | 7/2009 | Kim et al. | |
| 2009/0273732 A1 * | 11/2009 | Shimura et al. | 349/65 |
| 2011/0199787 A1 * | 8/2011 | Kim et al. | 362/612 |

FOREIGN PATENT DOCUMENTS

| | | |
|---|---|---|
| EP | 2 063 296 A2 | 5/2009 |
| KR | 10-2008-0018338 | 2/2008 |
| KR | 10-2008-0056365 | 6/2008 |
| KR | 10-2009-0036637 | 4/2009 |

OTHER PUBLICATIONS

English Abstract for Publication No. 10-2008-0056365.
English Abstract for Publication No. 10-2008-0018338.
English Abstract for Publication No. 10-2009-0036637.

* cited by examiner

Primary Examiner — David J Makiya
(74) Attorney, Agent, or Firm — F. Chau & Associates, LLC (57) ABSTRACT

A display apparatus includes a display panel, at least one light emitting diode package, and at least one light guide plate. The light emitting diode package includes a frame extending in a first direction, a plurality of branches branched from the frame in a second direction, and at least two light emitting diode chips inserted between and coupled with two adjacent branches.

14 Claims, 8 Drawing Sheets

LIGHT EMITTING DIODE PACKAGE AND DISPLAY APPARATUS HAVING THE SAME

CROSS-REFERENCE TO RELATED APPLICATION

This application claims priority under 35 U.S.C. §119 from Korean Patent Application No. 2010-44107 filed on May 11, 2010 in the Korean Intellectual Property Office (KIPO), the contents of which are herein incorporated by reference in their entirety.

BACKGROUND

1. Field of disclosure

Embodiments of the present invention are directed to a light emitting diode package and a display apparatus having the light emitting diode package.

2. Description of the Related Art

In general, a display apparatus such as a liquid crystal display or an electrophoresis display includes a liquid crystal display panel or an electrophoresis display panel to display an image. However, the liquid crystal display panel and the electrophoresis display panel are not self-emissive, so the display apparatus requires a backlight assembly to provide light to the display panels.

A display apparatus that can be driven by a local dimming method has been developed to reduce power consumption in the backlight assembly and improve the contrast ratio in the display panel. According to the local dimming method, the amount of light provided to the display panel changes depending upon the image displayed on the display panel.

SUMMARY

Exemplary embodiments of the present invention provide a light emitting diode package capable of improving its assemblability.

Exemplary embodiments of the present invention provide a display apparatus having the light emitting diode package.

According to an embodiment of the invention, a light emitting apparatus includes at least one light emitting diode package, a printed circuit board, and at least one light guide plate. The light emitting diode package provides light. The light emitting diode package includes a supporting member extending in a first direction and a plurality of light emitting diode chips to provide light. The light emitting diode chips are inserted into the supporting member in a second direction perpendicular to the first direction to be parallel to a surface of the supporting member.

The supporting member includes a frame and a plurality of branches. The frame extends in the first direction. The branches are branched from the frame in the second direction and spaced apart from each other. Each of the light emitting diode chips is inserted between and coupled with two adjacent branches and has a light exiting surface substantially parallel to the surface of the frame.

The light emitting diode package further comprises a back plate extending in the first direction and making contact with the surface of the supporting member and the light emitting diode chips. The printed circuit board is arranged perpendicular to the second direction to contact the supporting member and supply a power source voltage to the light emitting diode package. The printed circuit board may make contact either the frame or the supporting member.

The light guide plate may be disposed between a display panel and the light emitting diode package to guide the light to the display panel.

According to the above, since the light emitting diode chips are fixed to the supporting member in a line, the light emitting diode chips may be securely held in place, thereby preventing the occurrence of a bright line phenomenon. In addition, the light emitting diode package includes a frame electrode connected to a power source, so a process for providing an electrical connection between the light emitting diodes and the printed circuit board may be omitted.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout.

Hereinafter, exemplary embodiments of the present invention will be explained in detail with reference to the accompanying drawings.

Figure 1:
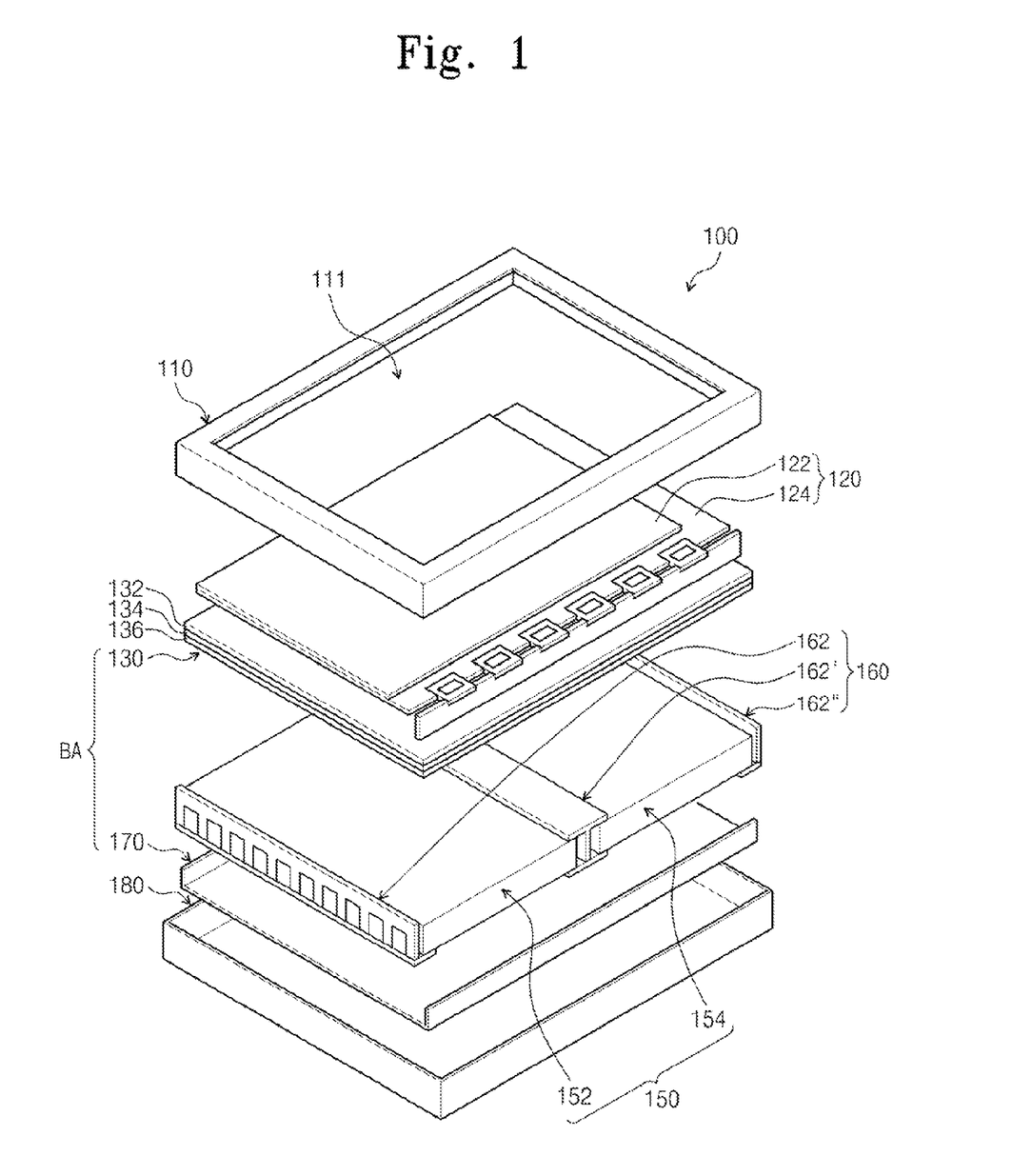
FIG. 1 is an exploded perspective view showing a display apparatus according to an exemplary embodiment of the present invention.

FIG. 1 is an exploded perspective view showing a display apparatus according to an exemplary embodiment of the present invention.

Referring to FIG. 1, a display apparatus 100 includes a display panel 120, a backlight assembly BA, a lower cover 180, and an upper cover 110.

The display panel 120 can display an image. The display panel 120 may be one of various display panels such as a liquid crystal display panel or an electrophoresis display panel. In a present exemplary embodiment, a liquid crystal display panel will be described as a representative example, however, other embodiments of the invention are not limited thereto.

The display panel 120 has a plate-like shape having a long side and a short side. The display panel 120 includes a first substrate 122, a second substrate 124 opposite to the first substrate 122, and a liquid crystal layer (not shown) disposed between the first and second substrates 122 and 124.

The first substrate 122 may include a plurality of pixel electrodes (not shown) and a plurality of thin film transistors electrically connected to the pixel electrodes in one-to-one correspondence. Each thin film transistor switches a driving signal applied to its corresponding pixel electrode. In addition, the second substrate 124 may include a common electrode that foil is an electric field with the pixel electrodes to control the arrangement of the liquid crystal molecules in the liquid crystal layer. Thus, the display panel 120 may display an image corresponding to the arrangement of the liquid crystal molecules.

The backlight assembly BA is disposed below the display panel 120. The backlight assembly BA includes a light source part 160, a light guide part 150, an optical member 130, and a reflection sheet 170.

The light source part 160 provides the display panel 120 with the light used to display the image on the display panel 120. The light guide part 150 guides the light provided from the light source part 160 to the display panel 120.

The light guide part 150 includes one or more light guide plates. Hereinafter, a light guide part 150 having two light guide plates will be described as a representative example, but the number of the light guide plates in the light guide part 150 is not limited thereto. The two light guide plates will be referred to as a first light guide plate 152 and a second light guide plate 154, respectively.

The light source part 160 includes a first light emitting diode package 162, a second light emitting diode package 162', and a third light emitting diode package 162". The first and second light guide plates 152 and 154 are disposed adjacent to at least one side of each of the first light emitting diode package 162, the second light emitting diode package 162', and the third light emitting diode package 162" to provide the light to the display panel 120.

The optical member 130 is disposed between the light guide part 150 and the display panel 120. The optical member 130 controls the light output from the light source part 160. The optical member 130 includes a diffusion sheet 136, a prism sheet 134, and a protection sheet 132, which are sequentially stacked on the light guide part 150.

The diffusion sheet 136 diffuses the light output from the light source part 160. The prism sheet 134 condenses the light diffused by the diffusion sheet 134 to allow the light to travel in a vertical direction with respect to the display panel 120. The light passing through the prism sheet 134 is vertically incident to the display panel 120. The protection sheet 132 is disposed on the prism sheet 134 to protect the prism sheet 134 from external impacts.

In a present exemplary embodiment, the optical member 130 including the diffusion sheet 136, the prism sheet 134, and the protection sheet 132 has been shown as a representative example, but it should not be limited thereto. That is, one or more of each of the diffusion sheet 136, the prism sheet 134, and the protection sheet 132 may be provided, or each may be removed from the optical member 130.

The reflection sheet 170 is disposed on the lower cover 180 below the light source part 160. The reflection sheet 170 may include a reflective material The reflection sheet 170 reflects to the display panel 120 light that leaked downward from the light guide part 160, and light from the first, second, and third light emitting diode packages 162, 162', and 162". As a result, the reflection sheet 170 may increase an amount of the light traveling to the display panel 120.

The upper cover 110 is disposed on the display panel 120. The upper cover 110 is provided with a display window 111 formed therethrough to expose a display area of the display panel 120. Thus, the upper cover 110 may support a front end of the display panel 120 when coupled with the lower cover 180.

The lower cover 180 provides a receiving space in which the backlight assembly BA and the display panel 120 are received. The upper cover 110 is coupled with the lower cover 180 to fix the backlight assembly BA and the display panel 120 to the lower cover 180.

Figure 2:
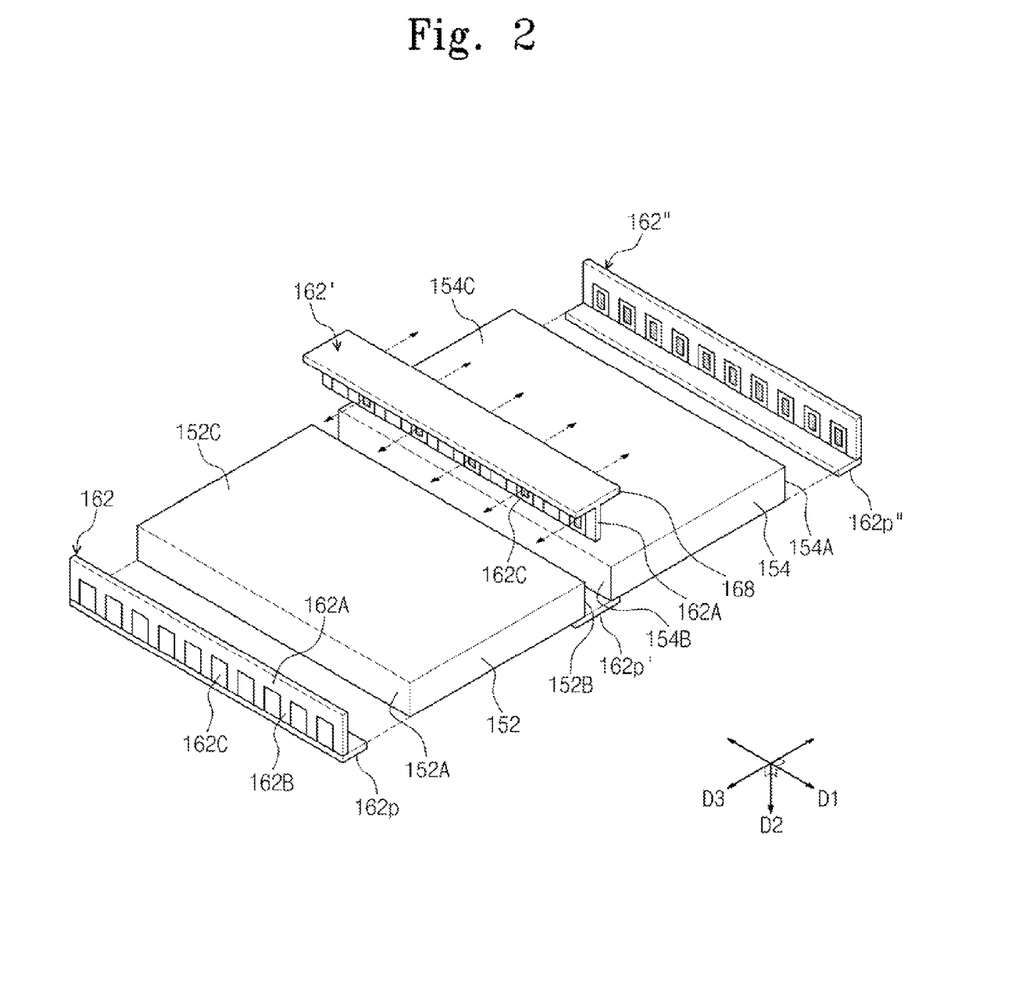
FIG. 2 is an exploded perspective view showing a coupling relation between a light guide part and first to third light emitting diode packages of FIG. 1.

FIG. 2 is an exploded perspective view showing a coupling relation between the light guide part 150 and first to third light emitting diode packages 162, 162', and 162" of FIG. 1.

Referring to FIG. 2, the light guide part 150 includes a first light guide plate 152 and a second light guide plate 154 spaced apart from the first light guide plate 152. Each of the first, second, and third light emitting diode packages 162, 162', and 162" is disposed adjacent to at least one side of the first and second light guide plates 152 and 154.

In particular, the first and second light guide plates 152 and 154 have a plate-like shape. The first light guide plate 152 includes a first light incident surface 152A and a second light incident surface 152B facing the first light incident surface 152A. In addition, the light guide plate 152 includes a first light exiting surface 152C that connects the first and second light incident surfaces 152A and 152B.

The first light emitting diode package 162 is positioned to face the first light incident surface 152A. The first light emitting diode package 162 extends along a lengthwise direction (hereinafter, referred to as a first direction D1) of the first light incident surface 152A.

The second light guide plate 154 includes a third light incident surface 154A and a fourth light incident surface 154B facing the third light incident surface 154A. In addition, the second light guide plate 154 includes a second light exiting surface 154C that connects the third and fourth light incident surfaces 154A and 154B.

The second light emitting diode package 162' is disposed between the first light guide plate 152 and the second light guide plate 154 such that each surface thereof faces the second light incident surface 152B and the fourth light incident surface 154B, respectively. The second light emitting diode package 162' extends along the first direction D1.

The third light emitting diode package 162" is disposed to face the third light incident surface 154A. The third light emitting diode package 162" extends along a lengthwise direction (e.g., the first direction D1) of the third light incident surface 154A.

Hereinafter, the first light emitting diode package 162 and the third light emitting diode package 162" will be explained, and then the second light emitting diode package 162' will be explained.

Figure 3:
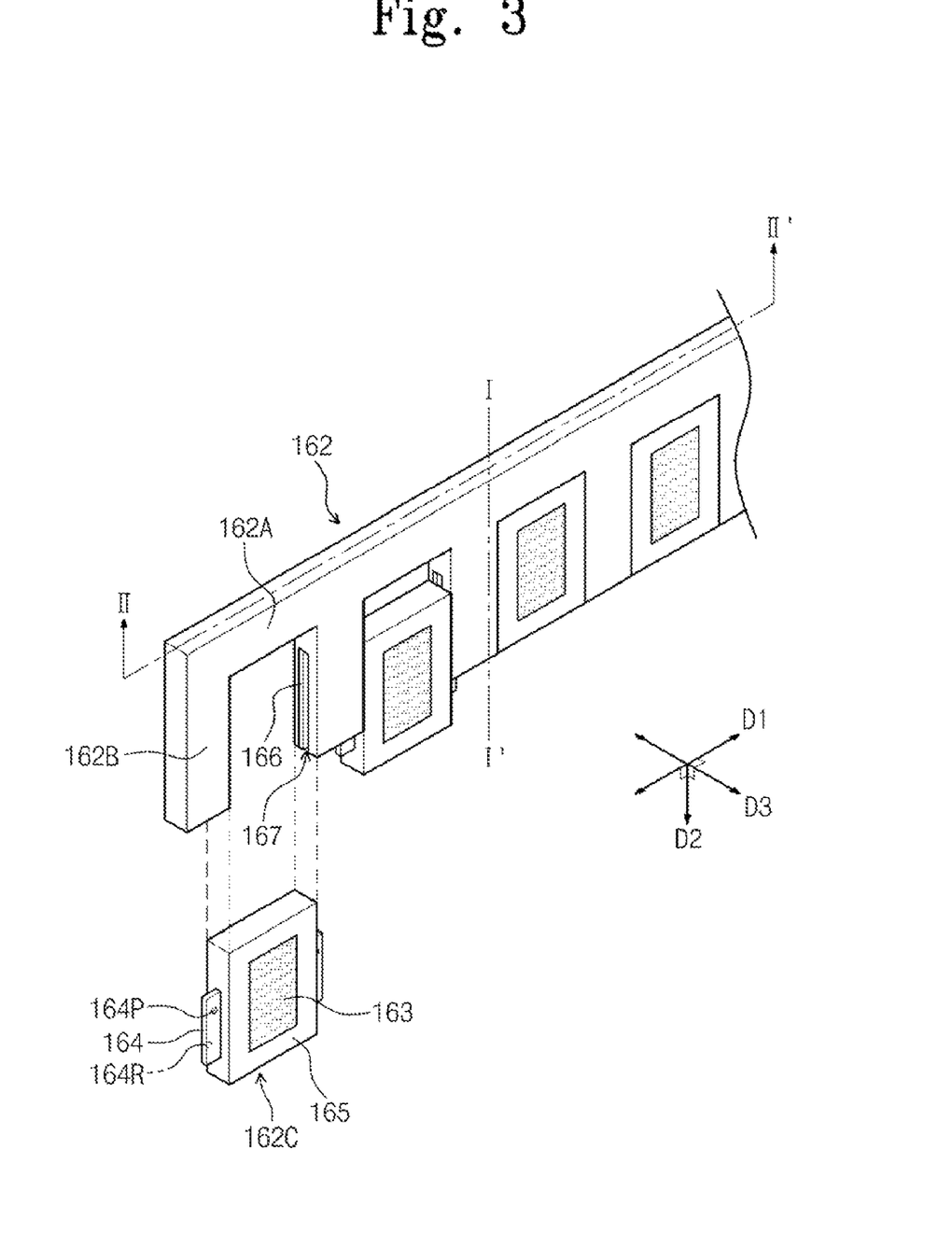
FIG. 3 is a perspective view showing a first light emitting diode package of FIG. 2.
Figure 4:
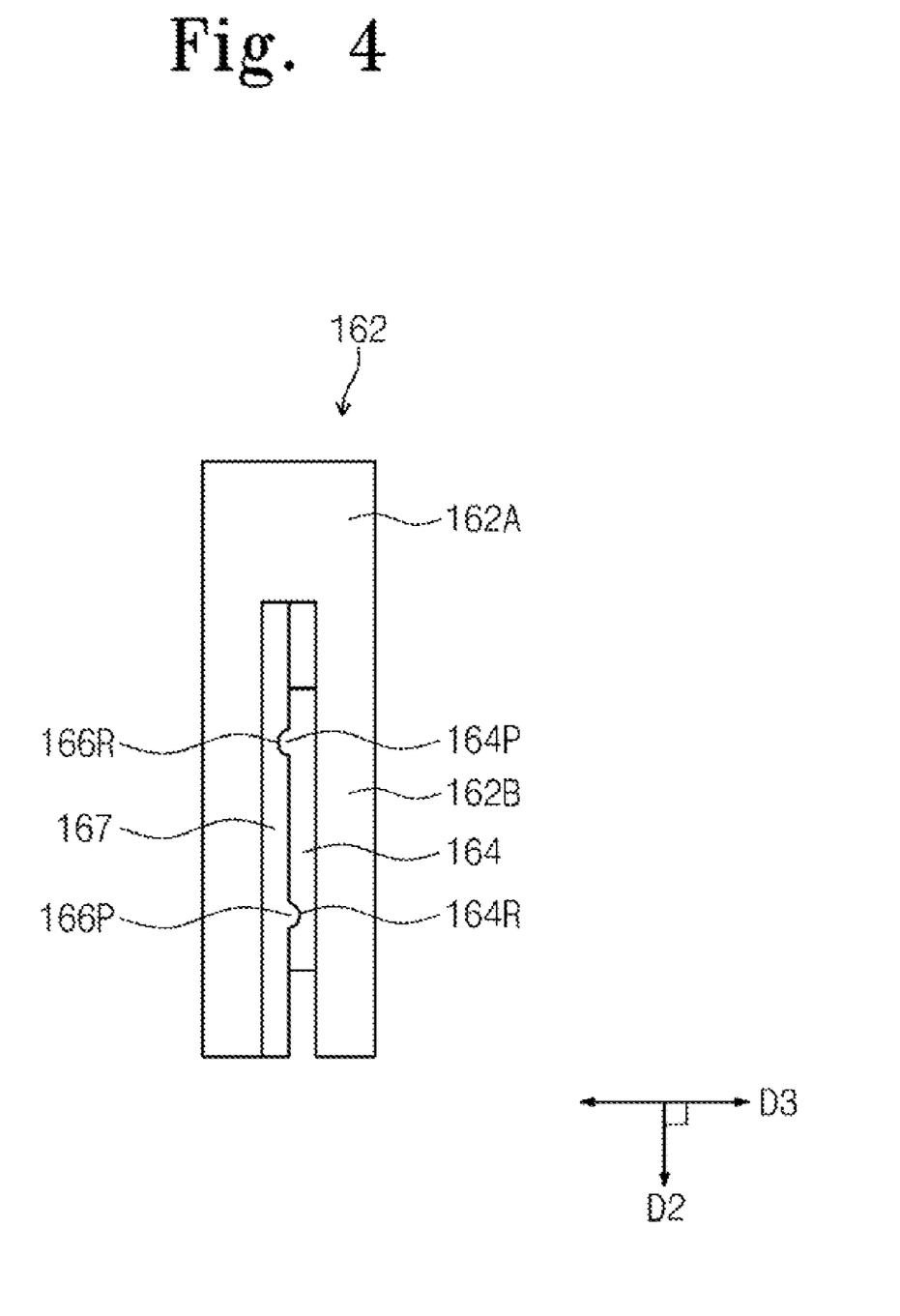
FIG. 4 is a sectional view taken along a line I-I' of FIG. 3.

FIG. 3 is a perspective view showing a first light emitting diode package of FIG. 2, and FIG. 4 is a sectional view taken along a line I-I' of FIG. 3.

Referring to FIGS. 1 to 4, the first light emitting diode package 162 and the third light emitting diode package 162" have the same structure and function and are symmetrical with each other with reference to the space between the first and second light guide plates 152 and 154. Accordingly, for the convenience of explanation, the first light emitting diode package 162 will be primarily described, and detailed description of the same portion of the third light emitting diode package 162" as the first light emitting diode package 162 will be omitted.

The first light emitting diode package 162 includes a plurality of light emitting diode chips 162C and a supporting member that holds the light emitting diode chips 162C.

The supporting member extends in the first direction D1 and includes a frame 162A, a plurality of branches 162B, and a plurality of frame electrodes 166.

The frame 162A extends in the first direction D1. The first direction D1 coincides with the lengthwise direction of the first light incident surface 152A of the first light guide plate 152 and the light emitting diode chips 162C are arranged in the first direction D1.

The branches 162B are protruded from the frame 162A in a second direction D2 substantially perpendicular to the first direction D1. Two branches 162B adjacent to each other are spaced apart from each other with a space interposed therebetween to receive one of the light emitting diode chips 162C. According to an embodiment of the invention, at least three branches 162B are provided to receive at least two light emitting diode chips 162C in a line. The light emitting diode chips 162C may be coupled with the branches 162B using various structures, such as a concavo-convex coupling structure, a hook-type coupling structure, a clip-type coupling structure, etc. In a present exemplary embodiment, a concavo-convex coupling structure will be described as a representative example, but coupling structures in other embodiments of the invention are not limited thereto.

Each branch 162B is provided with a guide recess 167 formed by recessing a surface facing a surface of an adjacent branch. The guide recess 167 is recessed toward the first direction D1 from the surface thereof. The guide recess 167 extends in the second direction D2 to have a rectangular cavity shape.

In a present exemplary embodiment, the frame 162A and the branches 162B include an insulative material such as a polymer resin, such as an acryl resin, an epoxy resin, etc. In addition, the frame 162A and the branches 162B may be integrally formed with each other. The frame 162A and the branches 162B may be formed through a single process, such as a molding process, by using the same material. The frame 162A and the branches 162B may be formed of a material that diffuses the light emitted from the light emitting diode chips 162C.

The frame electrodes 166 are located inside the guide recesses 167 in a one-to-one correspondence. Each of the frame electrodes 166 has a plate-like shape including a front surface and a rear surface and is thinner than a width of the guide recess 167. When locating a frame electrode 166 inside a guide recess 167, the frame electrode 166 is fixed inside the guide recess 167 such that the rear surface of each frame electrode 166 is parallel to a surface of the frame 162A. Thus, the front surface of each of the frame electrodes 166 may be spaced apart from the inner surface of each of the guide recesses 167 facing the front surface of the frame electrode 166.

Each of the frame electrodes 166 is provided with at least one of a protrusion 166P and a recess 166R, which are formed on the front surface of the frame electrodes 166. The protrusion 166P and the recess 166R are used to fix the light emitting diode chips 162C to the supporting member.

In a present exemplary embodiment, representative frame electrodes 166 each provided with one protrusion 166P and one recess 166R shape have been shown in FIGS. 3 and 4 as having a hemispherical shape, but the number and shape of the protrusions and recesses in other embodiments of the invention is not limited thereto. That is, a plurality of protrusions 166P or the recesses 166R may be provided having various other shapes, such as a polypyramid shape, a polyhedron shape, a hook shape, etc.

The frame electrodes 166 include a conductive material since they are used to apply a power source voltage to the light emitting source chips 162C.

Each of the light emitting diode chips 162C includes a body part and a wing part 164.

The body part includes a supporter 165 and a light emitting diode 163. The supporter 165 has a plate-like shape having a front surface and a rear surface. The supporter 165 may include a polymer insulating material such as an epoxy resin, acryl resin, but is not limited thereto. In a present exemplary embodiment, a width of the supporter 165 of each light emitting diode chip 162C in the first direction is narrower than a width of the supporter 165 in the second direction.

The light emitting diode 163 emits the light and is mounted on the front surface of the supporter 165. The light emitting diode 163 emits light that propagates away from the front surface of the supporter 165.

The wing part 164 protrudes from both sides of the supporter 165 of each of the light emitting diode chips 162C. That is, a pair of wing parts 164 is provided to each supporter 165 of each of the light emitting diode chips 162C. The wing part 164 corresponds to the guide recess 167 and extends along the second direction D2.

The wing part 164 is provided with at least one of a protrusion 164P and a recess 164R. The protrusion 164P and the recess 164R of each wing part 164 correspond to the recess 166R and the protrusion 166P of the frame electrodes 166 in number, position, and structure. The wing part 164 is formed of a conductive material such that each wing part 164 is electrically connected to the corresponding frame electrode 166 when inserted into the corresponding guide recess 167.

Hereinafter, the coupling structure between the supporting member of the first light emitting diode package 162 and the light emitting diode chips 162C will be described in detail.

The light emitting diode chip 162C is positioned such that a light exiting surface of the light emitting diode chip 162C is parallel to the surface of the frame 162A. Then, end portions of the wing parts 164 are respectively inserted into the guide recesses 167 of the two adjacent branches 162B, and then the light emitting diode chip 162C is pressed such that the light emitting diode chip 162C moves to the frame 162A from a lower portion of the branches 162B. Each wing part 164 is provided with at least one of the protrusion 164P and the recess 164R and each frame electrode 166 is provided with at least one of the protrusion 166P and the recess 166R. Accordingly, when the wing part 164 is inserted into the corresponding guide recess 167, the protrusion 164P of the wing part 164 is engaged with the recess 166R of the frame electrode 166 and the recess 164R of the wing part 164 is engaged with the protrusion 166P of the frame electrode 166. As a result, the light emitting diode chip 162C is completely coupled with the supporting member.

As described above, each of the light emitting diode chips 162C may be inserted between corresponding adjacent branches 162B in a line. The number of the light emitting diode chips 162C may be adjusted according to the number of the branches 162B.

According to a present exemplary embodiment, a printed circuit board 162p may be provided below the first light emitting diode package 162 to make contact with the lower portion of the branches 162B. The printed circuit board 162p supports the first light emitting diode package 162 and applies the power source voltage to the first light emitting diode package 162.

The printed circuit board 162p has an upper surface and a lower surface and extends in the first direction to have an elongated shape. Although not shown in FIGS. 1 to 4, the printed circuit board 162p may include a wire connected to an external power source. The printed circuit board 162p is arranged such that the upper surface thereof is positioned perpendicular to the direction D2. The wire is connected to a wire 169 in the first light emitting diode package 162, shown in FIG. 5 and described below, to apply the power source voltage to the light emitting diode chips 162C.

The upper surface of the printed circuit board 162p makes contact with the supporting member. The upper surface may make contact with the lower portion of the branches 162B or a lower portion of the frame 162A. In particular, in the case in which the upper surface of the printed circuit board 162p makes contact with the lower portion of the branches 162B, as shown in FIGS. 2 and 3, the branches 162B are positioned lower than the frame 162A and the frame 162A is positioned higher than the branches 162B. In this case, each of the light emitting diode chips 162C is inserted upwardly between the corresponding adjacent branches 162B. In a present exemplary embodiment, the printed circuit board 162p making contact with the lower portion of the branches 162B will be described as a representative, non-limiting example.

Alternatively, although not shown in FIGS. 1 to 4, in the case in which the upper surface of the printed circuit board 162p makes contact with the lower portion of the frame 162A, the branches 162B are positioned higher than the frame 162A and the frame 162A is positioned lower than the branches 162B. In this case, since each of the light emitting diode chips 162C is inserted downwardly between the corresponding adjacent branches 162B, the light emitting diode chips 162C may be coupled with the supporting member after the printed circuit board 162p makes contact with the supporting member.

A method of contacting the printed circuit board 162p with the first light emitting diode package 162 is not limited thereto. That is, the first light emitting diode package 162 may be fixed to the printed circuit board 162p after coating an adhesive (not shown) on the first light emitting diode package 162 or the printed circuit board 162p. In addition, although not shown in figures, the first light emitting diode package 162 may be coupled with the printed circuit board 162p using other methods, such as a screw coupling structure, a hook coupling structure, a concavo-convex coupling structure, etc.

In FIG. 2, the reference numerals 162p' and 162p" denote printed circuit boards respectively coupled with the second light emitting diode package 162' and the third light emitting diode package 162". The coupling method and structure between the printed circuit board 162p' and the second light emitting diode package 162', and between the printed circuit board 162p" and the third light emitting diode package 162", is substantially the same as that between the printed circuit board 162p and the first light emitting diode package 162, and thus detailed descriptions thereof will be omitted.

Figure 5:
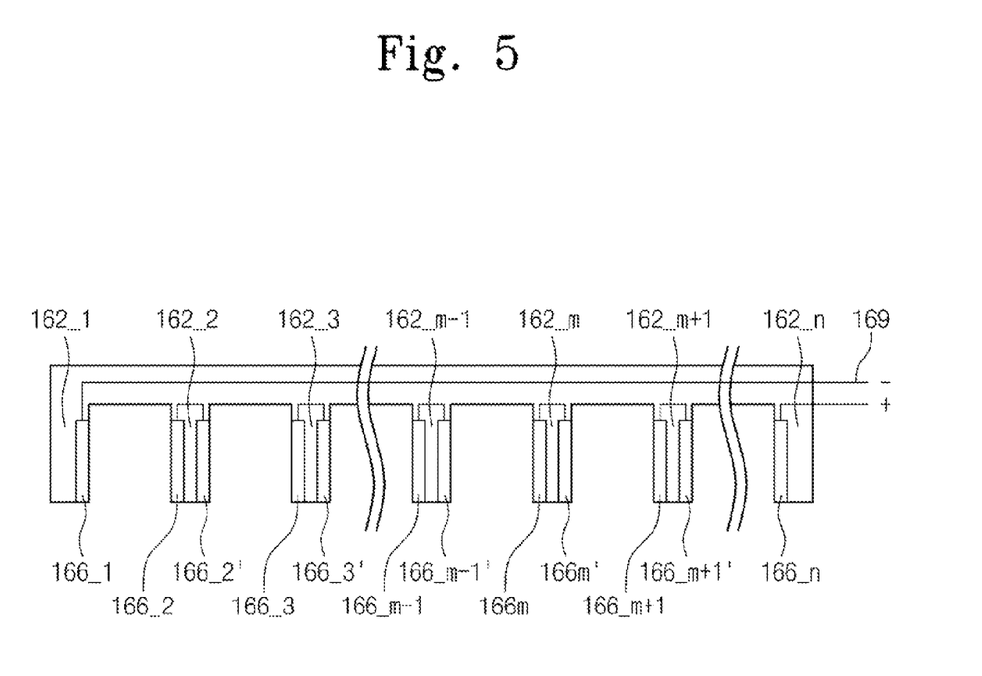
FIG. 5 is a sectional view taken along a line II-II' of FIG. 3.

FIG. 5 is a sectional view taken along a line II-II' of FIG. 3.

Referring to FIGS. 3 to 5, the supporting member includes the branches 162B.

The branches 162B includes a first branch 162_1 to n-th branch 162_n (n is a natural number equal to or larger than 3). Each frame electrode 166 is disposed inside the corresponding guide recess of the first to n-th branches 162_1 to 162_n.

The frame electrodes 166 includes first frame electrodes 166_1 and 166_n, second frame electrodes 166_2 to 166_n−1, and third frame electrodes 166_2' to 166_n−1'.

The first frame electrodes include the frame electrode 166_1 coupled with the first branch 162_1 and the frame electrode 166_n coupled with the n-th branch 162_n. The first branch 162_1 and the n-th branch 162_n correspond to outermost branches among the first to n-th branches 162_1 to 162_n. The second frame electrodes include the frame electrodes 166_2 to 166_n−1 each positioned at a first side portion of each corresponding branch 166_2 to 162_n−1, and the third frame electrodes include the frame electrodes 166_2' to 166_n−1' each positioned at a second side portion of each corresponding branch 166_2 to 162_n−1.

In detail, the first branch 162_1 includes the first frame electrode 166_1 disposed at the second side portion thereof facing the first side of the second branch 162_2. The second branch 162_2 includes the second frame electrode 166_2 disposed at the first side portion thereof facing the second side portion of the first branch 162_1 and the third frame electrode 166_2' disposed at the second side portion thereof facing the third branch 162_3. Similarly, an m-th branch 162_m (m is a natural number larger than 1 and smaller than n) includes the second frame electrode 166_m−1 disposed at the first side portion thereof facing an (m−1)-th branch 162_m−1 and the third frame electrode 166_m' disposed at the second side portion thereof facing an (m+1)-th branch 162_m+1. In addition, an n-th branch 162_n includes the first frame electrode (not shown) disposed at the first side portion thereof facing an (n−1)-th branch.

The first frame electrode 166_1 and the n-th frame electrode 166_n are connected to the printed circuit board 162p through the wires 169. The second and third frame electrodes included in each branch are connected to each other via the wires (169). For example, the second frame electrode 166_m in the m-th branch 162_m is connected to the third frame electrode 166_m' in the m-th branch 162_m via the wires 169.

Before the light emitting diode chips 162C are coupled with the supporting member, the second frame electrodes 166_2 to 166_n and the third frame electrode 166_2' to 166_n−1' are electrically insulated from the external power source since the first frame electrodes 166_1 and 166_n are electrically connected to the external power source.

When the light emitting diode chips 162C are completely coupled with the supporting member, the frame electrodes 166 respectively disposed at two adjacent branches 162B are electrically connected to each other through the corresponding light emitting diode chip 162 inserted between the adjacent branches 162B. For example, the third frame electrode 166_m−1' of the (m−1)-th branch 162_m−1 is electrically connected to the second frame electrode 166_m of the m-th branch 162_m through the light emitting diode chip 162C inserted between the (m−1)-th branch 162_m−1 and the m-th branch 162_m.

As a result, when the first frame electrodes 166_1 and 166_n are connected to the external power source after inserting the light emitting diode chips 163C between the branches 162B, the first frame electrodes 166_1 and 166_n, the second frame electrodes 166_2 to 166_n−1, the third frame electrodes 166_2' to 166_n−1', and the light emitting diode chips 162C are connected to each other in series.

As described above, the first light emitting diode package 162 may be electrically connected to the printed circuit board 162p. In this case, the light emitting diode chips 162C are not required to be directly connected to the printed circuit board 162p and it is enough that the first frame electrodes 166_1 and 166_n are electrically connected to the printed circuit board 162p.

Consequently, the first light emitting diode package 162 to which the external power source voltage is applied emits light in a direction, such as the third direction D3, substantially perpendicular to the first and second directions D1 and D2.

Figure 6:
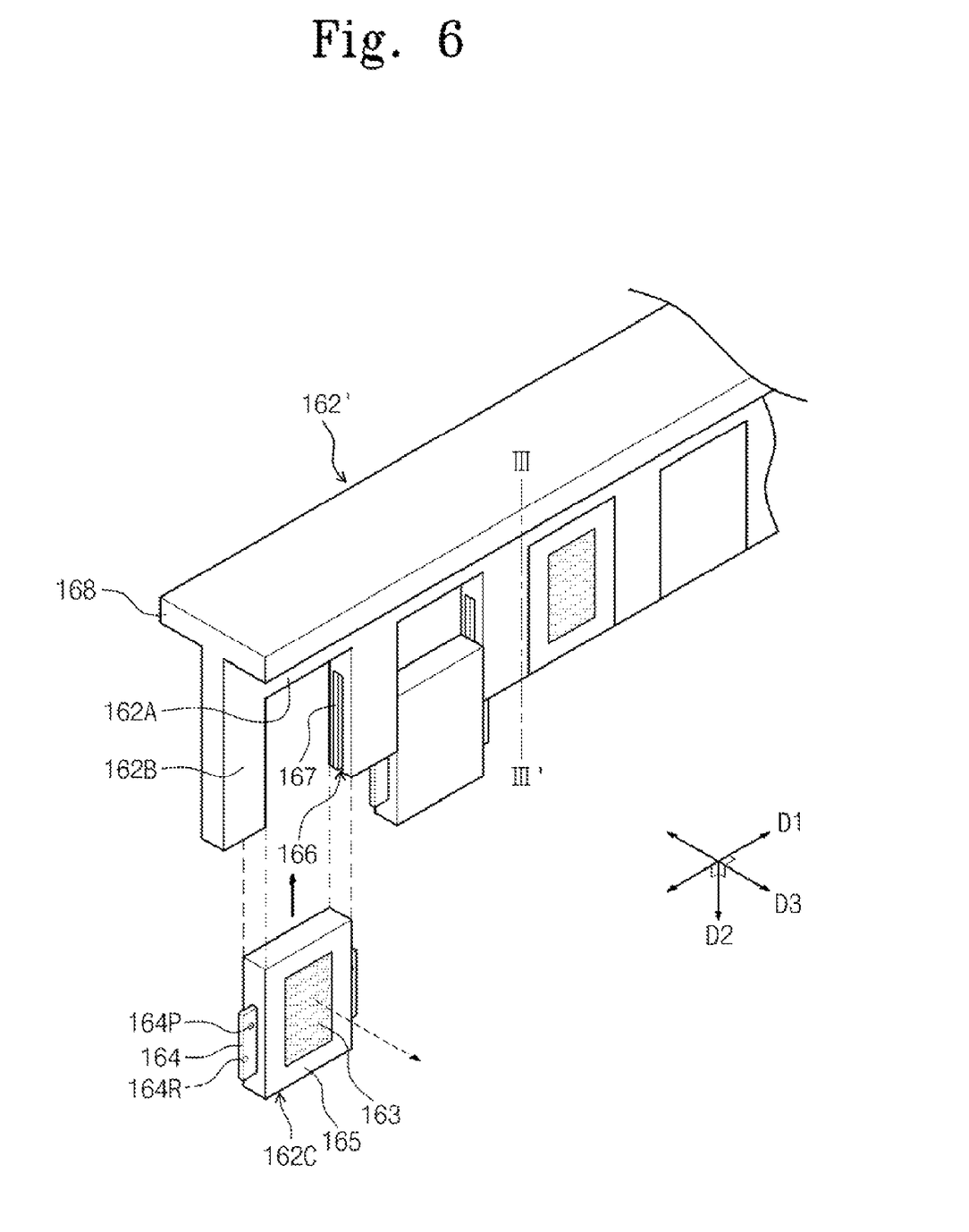
FIG. 6 is a perspective view showing a second light emitting diode package of FIG. 2.
Figure 7:
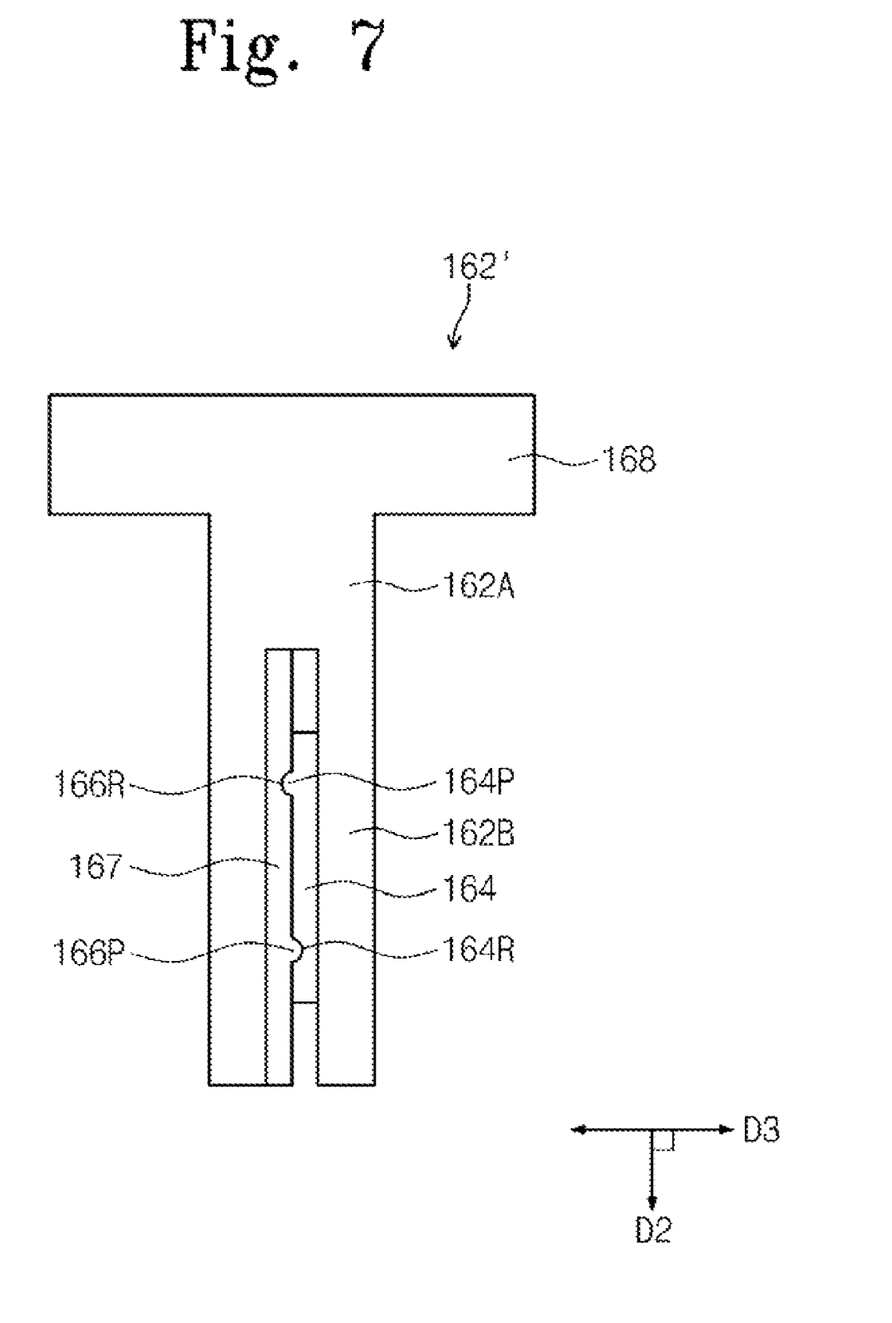
FIG. 7 is a sectional view taken along a line III-III' of FIG. 6.

FIG. 6 is a perspective view showing the second light emitting diode package of FIG. 2, and FIG. 7 is a sectional view taken along a line III-III' of FIG. 6. In FIG. 6, the same reference numerals denote the same elements in FIG. 3, and thus detailed descriptions of the same elements will be omitted.

Referring to FIGS. 1, 2, 6, and 7, the second light emitting diode package 162' includes the light emitting diode chips 162C and the supporting member that holds the light emitting diode chips 162C. The supporting member includes the frame 162A, the branches 162B, and the frame electrodes 166.

The frame 162A extends in the first direction D1.

The branches 162B are protruded in the second direction D2 substantially perpendicular to the first direction D1 from the frame 162A. Adjacent branches 162B are spaced apart from each other to provide a space therebetween in which one of the light emitting diode chips 162C is accommodated. According to an embodiment of the invention, at least three branches 162B are provided to arrange at least two light emitting diode chips 162C. Each branch 162B is provided with the guide recess 167 formed by recessing the surface facing the surface of the adjacent branch. The guide recess 167 is recessed toward the first direction D1 from the surface thereof.

Each of the light emitting diode chips 162C is inserted between the adjacent branches 162B. Each of the light emitting diode chips 162C includes the body part and the wing part 164, and the body part includes the supporter 165 and the light emitting diode 163.

The supporter 165 has the plate-like shape having the front surface and the rear surface. The wing part 164 protrudes from both sides of the supporter 165 of each of the light emitting diode chips 162C. That is, a pair of wing parts 164 is provided to each supporter 165 of each of the light emitting diode chips 162C. The wing parts 164 of each of the light emitting diode chips 162C are respectively inserted into the guide recesses 167 when each of the light emitting diode chips 162C is inserted between the corresponding adjacent branches 162B.

The light emitting diode chips 162C are positioned such that light exiting surfaces of the light emitting diodes 163 are parallel to the surface of the frame 162A. For the first light emitting diode package 162, the light emitting diode chips 162C are arranged such that the light exiting surfaces of the light emitting diodes 163 face the same direction, but, for the second light emitting diode package 162', the light emitting diode chips 162C are arranged such that the light exiting surfaces of the light emitting diode chips 162C alternately face opposite directions.

Since the light exiting surfaces of the light emitting diodes 163 are arranged to alternately face the opposite directions with respect to the surface of the frame 162A in the second light emitting diode package 162', the light emitting diodes 163 may emit light propagating in opposite directions substantially perpendicular to both surfaces of the frame 162A. Accordingly, the second light emitting diode package 162' may provide light to the second light incident surface 152B and the fourth light incident surface 154B.

In a present exemplary embodiment, the light exiting surfaces of the light emitting diodes 163 are arranged to alternately face opposite directions, but other embodiments of the invention are not limited thereto. For example, if the supporting member is divided into plural areas, the light exiting surfaces of the light emitting diodes 163 in different areas may be arranged to alternately face opposite directions. That is, the light exiting surfaces of the light emitting diodes 163 included in the same area face the same direction, and the light exiting surfaces of the light emitting diodes 163 included in adjacent areas face the opposite direction. Thus, the propagation direction and intensity of the light may be controlled.

The frame 162A of the second light emitting diode package 162' is provided with a cover 168 that extends from both sides of an upper portion of the frame 162A in directions substantially perpendicular to the first and second directions D1 and D2. The cover 168 has a plate-like shape and extends in the first direction D1.

The cover 168 covers a portion of the first light guide plate 152 and a portion of the light guide plate 154, which face each other. Consequently, an upper portion of the second light incident surface 152B and an upper portion of the fourth light incident surface 154B are covered by the cover 168.

The light emitted from the second light emitting diode package 162' is incident to the second and fourth light incident surfaces 152B and 154B and provided to the display panel 120 through the first and second light exiting surfaces 152C and 154C, respectively. However, since the first light guide plate 152 and the second light guide plate 154 are spaced apart from each other by the second light emitting diode package 162', the light emitted from the light emitting diode chips 162C may propagate upward through the space between the first and second light guide plates 152 and 154, rather than being incident to the second light incident surface 152B or the fourth light incident surface 154B. However, the cover 168 may block or diffuse the light propagating upwards. To this end, the cover 168 may include an opaque material (e.g., a black material) to block the light propagating upwards. In addition, the cover 168 may include a light diffusion material to diffuse the light propagating upwards. Therefore, a bright line caused by the light propagating upwards through the space between the first and second light guide plates 152 and 154 may be prevented, thereby preserving brightness uniformity of the display panel 120.

In addition, the cover 168 may prevent the first and second light guide plates 152 and 154 from coming off. When the second light emitting diode package 162' is not provided with the cover 168, the first and second light guide plates 152 and 154 may move upwards or expand due to heat applied from the first, second, and third light emitting diode packages 162, 162', and 162''. As a result, the first and second light guide plates 152 and 154 may shift from their original positions. The cover 168 provided with the frame 162A and the branches 162B may hold the positions of the first and second light guide plates 152 and 154.

According to a present exemplary embodiment, the cover 168 includes an insulative material such as polymer resin, such as an acryl resin, an epoxy resin, etc. In addition, the cover 168 may be integrally formed with the frame 162A and the branches 162B. The cover 168, the frame 162A, and the branches 162B may be formed through a single process, such as a molding process, using the same material.

In the first light emitting diode package 162, the second light emitting diode package 162', and the third light emitting diode package 162'', the light emitting diode chips 162C are securely fixed to the supporting member and the corresponding printed circuit board of the printed circuit boards 162p, 162p', and 162p'' and are arranged in line in the first direction D1. Accordingly, the light emitting diode chips 162C may be securely held in place, as opposed to the case when the light emitting diode chips are mounted on a printed circuit board without employing a supporting member.

In detail, conventional light emitting diode chips are vertically and independently mounted on a printed circuit board. It is challenging to vertically mount a thin plate shape light emitting diode chip onto a printed circuit board and the mounted chips are easily inclined by external forces, causing light leakage and display defects on the display panel. In a present exemplary embodiment, the light emitting diode chips are inserted into guide recesses formed in the frame 162A, and are arranged in a line with a uniform spacing. Thus, the light emitting diode chips may be securely held in place to prevent light leakage and improve display quality.

In addition, since not all of the light emitting diode chip need to be supplied with the power source voltage, in the case when the power source voltage is applied to the wire in the light emitting diode package, not all of the light emitting diode chips need to be directly mounted on the printed circuit board. Furthermore, the printed circuit board used to fix the lower portion of the light emitting diode package may be removed. When removing the printed circuit board, the first to third light emitting diode packages 162, 162', and 162" may be mounted on another element, such as the lower cover 180. In addition, although not shown in FIG. 1, the first to third light emitting diode packages 162, 162', and 162" may be attached onto a mold frame used to receive the optical member 130.

Alternatively, the first light emitting diode package 162, the second light emitting diode package 162', and the third light emitting diode package 162" may be operated independently, so that different intensities of light may be provided to the first light guide plate 152 and to the second light guide plate 154. Accordingly, the light intensity provided to the display panel 120 through the first light guide plate 152 and the second light guide plate 154 may be adjusted according to the position of the display area of the display panel 120, thereby realizing local dimming.

Figure 8:
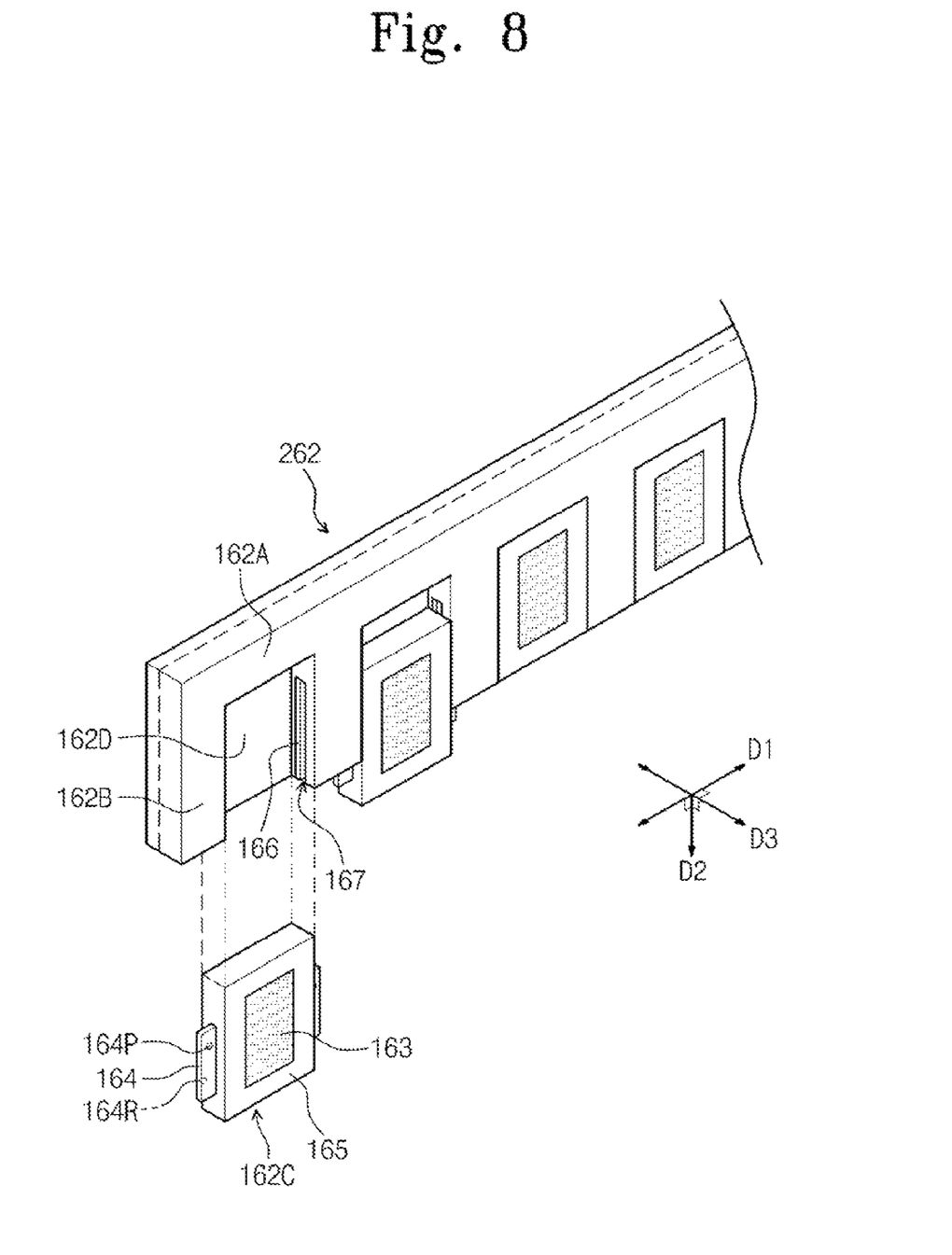
FIG. 8 is a perspective view showing a first light emitting diode package according to another exemplary embodiment of the present invention.

FIG. 8 is a perspective view showing a first light emitting diode package according to another exemplary embodiment of the present invention. In FIG. 8, a light emitting diode package 262 according to a present exemplary embodiment has the similar structure and function as those of the first light emitting diode package 162 shown in FIG. 3, and thus the same reference numerals are assigned to the same elements and detailed description of the same elements will be omitted.

The first light emitting diode package 262 extends in the first direction D1 and includes a back plate 162D that makes contact with a surface of the supporting member and the light emitting diode chips.

The back plate 162D may be integrally formed with the supporting member. The back plate 162D may be formed through a single process, such as a molding process, with the frame 162A and the branches 162B. The back plate 162D may include a material that may diffuse light and include a material identical to the material for the supporting member, such as polymer resin (for example, an acryl resin, an epoxy resin, etc.). However, the structure of the back plate 162D is not limited thereto in other embodiments of the invention. For example, the back plate 162D may be attached to the surface of the supporting member after being separately formed.

The back plate 162D attached to or integrally formed with the supporting member may enhance the strength of the supporting member, so the supporting member may maintain its original shape. In other words, the back plate 162D may prevent the frame 162A and the branches 162B from being bent or damaged, thereby securely holding the light emitting diode chips 162C.

In the above-described embodiments, two light guide plates and three light emitting diode packages have been described, but the number of the light guide plates and the number of the light emitting diode packages may vary. When one light guide plate is used with the display apparatus, the first light emitting diode package may be disposed adjacent to at least one side of the light guide plate to provide light to the light guide plate. Alternatively, when four light guide plates arranged in a checkerboard shape are used with the display apparatus, the second light emitting diode package may be disposed in a cross shape between the four light guide plates.

Although exemplary embodiments of the present invention have been described, it is understood that other embodiments of the present invention should not be limited to these exemplary embodiments and that various changes and modifications can be made by one ordinary skilled in the art within the spirit and scope of the embodiments of present invention as hereinafter claimed.

What is claimed is:

1. A light emitting apparatus comprising:
   a plurality of light emitting diode packages, each including a supporting member extending in a first direction and a plurality of light emitting diode chips, the light emitting diode chips being inserted into the supporting member in a second direction perpendicular to the first direction to be parallel to a surface of the supporting member, wherein the light emitting diode packages comprise a first light emitting diode package of which the light exiting surfaces are arranged to face a same direction substantially perpendicular to the first direction of the supporting member, and a second light emitting diode package of which the light exiting surfaces are alternately arranged to face two opposing directions substantially perpendicular to the first direction of the supporting member;
   a printed circuit board arranged perpendicular to the second direction to contact the supporting member and supply a power source voltage to the light emitting diode package; and
   a plurality of light guide plates disposed adjacent to the light emitting diode package, wherein the second light emitting diode package is disposed between two adjacent light guide plates.

2. The light emitting apparatus of claim 1, wherein the supporting member comprises:
   a frame extending in the first direction; and
   a plurality of branches branched from the frame in the second direction and spaced apart from each other,
   wherein each of the light emitting diode chips is inserted between and coupled with two adjacent branches and has a light exiting surface substantially parallel to the surface of the frame.

3. The light emitting apparatus of claim 2, wherein the printed circuit board makes contact with either the frame or the supporting member.

4. The light emitting apparatus of claim 3, wherein the light emitting diode package further comprises a back plate extending in the first direction and making contact with the surface of the supporting member and the light emitting diode chips.

5. The light emitting apparatus of claim 2, wherein the light emitting diode chips are coupled with the branches with one of a concavo-convex coupling structure, a hook-type coupling structure, or a clip-type coupling structure.

6. The light emitting apparatus of claim 2, wherein each of the branches comprises a guide recess extending in the second direction and each of the light emitting diode chips comprises a body part and a pair of wing parts protruded from the body adapted to be inserted into the guide recess.

7. The light emitting apparatus of claim 6, wherein the body comprises a supporter having a plate-like shape with a front surface, a rear surface, and a light emitting diode mounted on a front surface of the supporter, and the wing parts protrude from both sides of the supporter.

8. The light emitting apparatus of claim 7, wherein each of the wing parts comprises at least one of a protrusion and a recess, and the guide recess is provided with at least one of a recess corresponding to the protrusion of the wing parts and a protrusion corresponding to the recess of the wing parts.

9. The light emitting apparatus of claim 7, further comprising a frame electrode disposed inside the guide recess that electrically connects to the light emitting diode.

10. The light emitting apparatus of claim 9, wherein the wing parts comprise a conductive material and make contact with the frame electrode.

11. The light emitting apparatus of claim 2, wherein a number of the plurality of branches is greater than or equal to 3.

12. The light emitting apparatus of claim 9, wherein
each of a first and a last branch comprises a first guide recess,
each of a second to and next-to-last branches comprises a second guide recess formed at a first side thereof and a third guide recess formed at a second side thereof, and
the frame electrode comprises a first frame electrode disposed in the first guide recess and electrically connected to the printed circuit board,
a second frame electrode disposed in the second guide recess, and
a third frame electrode disposed in the third guide recess and electrically connected to the second frame electrode.

13. The light emitting apparatus of claim 1, wherein the supporting member for the second light emitting diode package comprises a cover that extends from both sides of the supporting member in directions substantially perpendicular to the first and second directions, wherein the cover covers a portion of each of the two adjacent light guide plates.

14. The light emitting apparatus of claim 1, wherein each of the light emitting diode chips has a width in the first direction narrower than a width in the second direction.

* * * * *